United States Patent [19]

Ezawa et al.

[11] Patent Number: 5,252,305

[45] Date of Patent: Oct. 12, 1993

[54] PROCESS OF RECOVERING PLATINUM GROUP METAL

[75] Inventors: Nobuyasu Ezawa; Hiroshi Inoue, both of Tokyo; Shoei Takada; Hitoshi Masuda, both of Akita, all of Japan

[73] Assignees: Tanaka Kikinzoku Kogyo K.K.; Dowa Mining Co., Ltd.; Kosaka Smelting & Refining Co., Ltd., all of Tokyo, Japan

[21] Appl. No.: 865,949

[22] Filed: Apr. 9, 1992

[30] Foreign Application Priority Data

Apr. 10, 1991 [JP] Japan .................................. 3-104827

[51] Int. Cl.$^5$ ...................... C01G 55/00; C22B 11/00; C22B 9/10
[52] U.S. Cl. ............................................ 423/22; 502/22
[58] Field of Search ......................... 423/22, 21.1, 21.5, 423/23, 210, 35; 75/632, 633, 746; 502/22, 23

[56] References Cited

U.S. PATENT DOCUMENTS

| | | | |
|---|---|---|---|
| 3,071,551 | 1/1963 | Robinson et al. | 423/22 |
| 3,920,790 | 11/1975 | Pittie et al. | 423/22 |
| 4,069,040 | 1/1978 | Thomas et al. | 423/22 |
| 4,196,096 | 4/1980 | Dawes et al. | 252/414 |
| 4,578,368 | 3/1986 | Zoeller | 502/28 |
| 4,585,628 | 4/1986 | Fischer, Jr. et al. | 423/22 |
| 4,659,683 | 4/1987 | Biffar et al. | 502/24 |
| 4,960,573 | 10/1990 | Okutani et al. | 423/22 |

FOREIGN PATENT DOCUMENTS 629347 10/1961 Canada.

Primary Examiner—David Brunsman
Attorney, Agent, or Firm—Sughrue, Mion, Zinn, Macpeak & Seas

[57] ABSTRACT

A process of recovering a platinum group metal from a waste catalyst comprising a first step which comprises heating and melting the catalyst impregnated with the platinum group metal, copper and/or the oxide of copper, a flux component and a reductant component to form a layer containing the metal copper into which the platinum group metal is absorbed and another layer of the oxide, and then separating the metal copper; and a second step which comprises supplying air or oxygen as an oxidant to the separated metal copper for oxidizing under heating and melting to form a layer of partially oxidized metal copper and another layer of the metal copper containing the concentrated platinum group metal, and separating it. This process enables the economical recovery of the platinum group metal from the waste catalyst in a short period of time with high recovery rate.

7 Claims, No Drawings

PROCESS OF RECOVERING PLATINUM GROUP METAL

BACKGROUND OF THE INVENTION

The present invention relates to a process of recovering a platinum group metal from a waste catalyst having, for example, a honeycomb shaped or pelletized support formed by cordierite, alumina or the like containing the platinum group metal for purifying a waste gas of an automobile (hereinafter referred to as "SAC").

Heretofore, the following methods have been employed for recovering a platinum group metal from SAC. One method consists of extracting the platinum group metal with a solution prepared by adding an oxidant to an acid such as aqua regia, repeating the procedures of solid-liquid separation from SAC and of washing, reducing the platinum group metal by adding such a reductant as a base metal, hydrazine and sodium borohydride (SBH) to the solution containing the platinum group metal and filtering the platinum group metal. Another method consists of controlling the acidity of the solution having extracted the platinum group metal, extracting the platinum group metal with an organic solvent, back-extracting with such an appropriate solvent as ammonia and reducing with a reductant for recovery.

The extraction method employing such an acid as aqua regia possesses the following drawbacks. The extraction yield thereof is low so that the repetitive extraction procedures are required to overcome the low yield. Therefore, a large volume of an acid for extraction is wasted and the extracted platinum group metal is diluted due to the large amount of the solution employed for acid extraction. A plenty of labor and time are necessary to attain a high recovery rate by mean of reduction, that lacks profitability.

A further method is employed which consists of adding SAC as a slag component to a smelting process of copper, lead or iron, forcing the copper, the lead, the iron or their sulfides to absorb the platinum group metal by means of melting, and taking out the platinum group metal as anode slime through electrolytic refining. A still further method consists of dissolving the iron with an acid and extracting and separating the platinum group metal with an organic solvent.

The method of electrolytic refining of the copper or lead possesses the drawbacks that because not all of the copper or lead containing the platinum group metal employed as an electrode can be electrolyzed so that the remaining portion of the electrode is added to another electrode in the next process and is electrolyzed, a long period of time is required for recovering all the platinum group metal, that lacks profitability. Another drawback of the electrolyzing method resides in that because palladium and rhodium out of the platinum group metals dissolve into an electrolyte which cannot be recovered as anode slime, the palladium and the rhodium dissolved in the electrolyte must be recovered through another method.

Since, in the above process of iron smelting, it is difficult to allow the platinum group metal to exist in the iron at a high concentration, a large volume of iron into which the platinum group metal is absorbed is required so that a volume of an acid which is employed for dissolving the large amount of iron is inevitably large, that also lacks profitability.

SUMMARY OF THE INVENTION

The present invention has been made to overcome the above drawbacks of the prior art.

An object of the present invention is to provide a process of recovering a platinum group metal from SAC.

Another object is to provide a process of recovering a platinum group metal at a high recovering rate in a short period of time with high profitability.

The present invention is in a process of recovering a platinum group metal from a catalyst comprising a catalyst support a main component of which is the oxide or the oxides of silicon, aluminum, magnesium and a rare earth metal, and the platinum group metal impregnating therein; the improvement which comprises a first process which comprises heating and melting the catalyst impregnated with the platinum group metal, copper and/or copper oxide, a flux component and a reductant component to form a layer containing the metal copper into which the platinum group metal is absorbed and another layer of the oxide, and then separating the metal copper; and a second process which comprises supplying air or oxygen as an oxidant to the separated metal copper for oxidizing under heating and melting to form a layer of partially oxidized metal copper and another layer of the metal copper containing the concentrated platinum group metal, and separating it. In the present invention, at least one of sodium nitrate, potassium nitrate and cupric oxide can be added as an oxidant of the second process, and recovery material of which a main component is a base metal, active carbon and resin and which contains a precious metal can be employed as a reductant of the first process.

The present invention is the process of isolating the platinum group metal from SAC on which the platinum group metal is supported utilizing the property that the platinum group metal and SAC are respectively separated by means of the melted copper and copper oxide.

In the process of this invention, the platinum group metal can be recovered from SAC with high profitability without employing a large amount of acids and without considering the post-treatment of the large amount of the acids, these being inevitable in the prior art process.

It is also possible to circulate and reuse the copper oxide obtained in the second process in the first process, thus further enabling the large cost down.

Moreover, the platinum group metal in SAC can be recovered with high profitability and a short period of time employing the process with a fewer steps.

The content of the platinum group metal in the metal copper layer, that is, the concentration rate can be easily controlled by repeating the second process.

The process according to the present invention is epoch making which enables the effective separation and recovery of the platinum group metal from SAC.

DETAILED DESCRIPTION OF THE INVENTION

In a first process of the present invention, after crushed or milled SAC, a flux component such as silica, calcium carbonate, calcium oxide and iron oxide of which a mixing ratio is suitable for forming a glass-like oxide with SAC, copper and/or copper oxide for absorbing a platinum group metal and such a reductant as coke are sufficiently mixed in an appropriate mixing ratio, it is heated and melted in an electric furnace preferably at 1300° to 1400° C.

The main components of SAC are converted into the glass-like oxides (hereinafter referred to as "slag") forming a layer after the continuation of the melting at the above temperature, and the copper oxide is reduced with the reductant such as the coke to the metal copper to form a layer of the melted metal copper after the sedimentation due to the difference of the specific gravities therebetween.

The platinum group metal contained in SAC is dispersed in the slag and is absorbed in the metal copper and subject to sedimentation followed by the absorption in the metal copper layer and the separation from SAC.

After the melting is conducted for a sufficient period of time until the platinum group metal dispersed in the slag is absorbed and sedimented in the metal copper and is absorbed in the metal copper layer, the upper melted slag is forced to flow out of the electric furnace, and the lower melted metal copper layer is introduced, for separation from the upper layer, into another furnace in which a second process is conducted.

Air or oxygen is blown as an oxidant into the melted metal copper introduced to the furnace in which the second process is conducted for oxidizing the portion of the metal copper while the copper is heated at a temperature the metal copper is maintained in the melted state. The layer of the copper oxide thus oxidized is made to be an upper layer, and a lower layer becomes a layer of unoxidized metal copper absorbing the concentrated platinum group metal.

Then, after the upper layer of the copper oxide is flown out and separated by tilting the furnace, the lower layer of the metal copper in which the platinum group metal is concentrated is flown out and is made solidified by cooling.

Most importantly, the concentrating of the platinum group metal is carried out in this process by oxidizing the portion of the metal copper absorbing the platinum group metal after the first process to form the layer of the copper oxide followed by the separation of the metal copper absorbing the platinum group metal from the layer of the copper oxide. Since the platinum group metal is contaminated in the layer of the copper oxide when the metal copper is rapidly oxidized to form a large amount of the copper oxide layer, the separation is desirably conducted when the sufficient layer is formed to the extent that the layer can be flown out and separated by tilting the furnace after the mild oxidation is allowed to occur on the surface of the melted metal copper. Further repetition of the oxidation and the separation may be performed for elevating the platinum group metal content. The platinum group metal content may be arbitrarily controlled in the range between several percent and 80 percent in weight. For elevating the recovery ratio of the platinum group metal, it is preferably in the range between 25 and 75 percent in weight.

The layer of the copper oxide flown out and separated may be, after solidified by cooling and isolated, reused in the first process for elevating the recovery ratio of the platinum group metal.

While air or oxygen is employed as an oxidant for the portion of the metal copper in the second process, at least one of sodium nitrate, potassium nitrate and cupric oxide may be added for promoting the oxidation.

When the sodium nitrate and the potassium nitrate are employed as the oxidant, a layer of sodium oxide or potassium oxide is formed on the upper portion of the copper oxide. The oxide may be, with the copper oxide, flown out, separated, solidified by cooling and isolated, and it can be added to the first process and employed as a flux component of the first process.

While coke is preferably employed in the first process as a reductant component thereof, the reductant component is not restricted to the coke and other reductants such as a base metal containing a precious metal, active carbon, resin and the like can be employed.

The reason the base metal containing the precious metal is employed is that the expensive precious metal can be quite effectively recovered concurrently with the platinum group metal because the precious metal is absorbed in the metal copper in a similar manner as the platinum group metal contained in SAC is absorbed in the metal copper.

EXAMPLES

Although Examples of the process of recovering the platinum group metal in accordance with the present invention will be described, these Examples do not restrict the invention.

EXAMPLE 1

Crushed material of 1000 kg of SAC having a diameter of not more than 5 mm and containing 1000 ppm of Pt, 400 ppm of Pd and 100 ppm of Rh (the support had a honeycomb-like shape and consisted of 80 percent of cordierite, 15 percent of $\gamma$-alumina and 5 percent of other oxides) prepared by means of a crusher was mixed with flux components composed of 750 kg of quarz sand (silica), 1750 kg of calcium carbonate and 550 kg of iron oxide and reductant components composed of 150 kg of coke powder and 560 kg of copper oxide powder. After the mixture was introduced into an electric furnace and heated at 1350° C. for 4 hours at a melted state, a glass-like oxide upper layer was flown out from the side of the electric furnace. Then, a copper oxide lower layer was introduced into a heated oxidation furnace through the bottom of the electric furnace. Oxygen-rich air containing 40 percent of oxygen was blown on the surface of the molten bath to oxidize the portion of the metal copper. When the thickness of the copper oxide layer was reached to about 0.5 cm, the oxidation furnace was tilted so that the copper oxide layer was flown out, and was poured on a water-cooled roll for solidification by cooling.

The oxygen-rich air was continuously blown into the melted metal copper in the oxidation furnace. After the procedures of tilting the oxidation furnace for flowing out the copper oxide layer similarly formed and of solidifying the layer by cooling were repeated, the metal copper was introduced into a small-size oxidation furnace when the weight of the metal copper layer containing the concentrated platinum group metal reached 30 kg. The procedures of oxidizing the portion of the metal copper and of flowing out and separating the copper oxide were repeated, and the oxidation procedure was stopped when the weight of the melted metal copper was reduced to about 3 kg. Then, the metal copper containing the concentrated platinum group metal was flown out and solidified by cooling.

The weight of the metal copper containing the concentrated platinum group metal thus obtained was 3 kg, the Pt content thereof was 33 percent in weight, Pd was 12 percent in weight and Rh was 3.2 percent in weight.

The time required for carrying out the above procedures was 20 hours.

For confirmation, analysis of the contents of the platinum group metals contained in the glass-like oxide layer gave not more than 1 ppm of Pt, not more than 0.2 ppm of Pd and not more than 0.1 ppm of Rh.

EXAMPLE 2

The same procedures as those of Example 1 were conducted except that the copper oxide powder obtained in Example 1 through the oxidation and the solidification was added into the starting copper oxide powder. The weight of the metal copper containing the concentrated platinum group metal thus obtained was 3 kg, the Pt content was 33 percent in weight, Pd was 13 percent in weight and Rh was 3.3 percent in weight.

The time required for carrying out the above procedures was 20 hours.

For confirmation, analysis of the contents of the platinum group metals contained in the glass-like oxide layer gave not more than 1 ppm of Pt, not more than 0.2 ppm of Pd and not more than 0.1 ppm of Rh.

COMPARATIVE EXAMPLE

Crushed material of 1000 kg of SAC having a diameter of not more than 5 mm and containing 1000 ppm of Pt, 400 ppm of Pd and 100 ppm of Rh (the support had a honeycomb-like shape and consisted of 80 percent of cordierite, 15 percent of $\gamma$-alumina and 5 percent of other oxides) prepared by means of a crusher was mixed with flux components composed of 750 kg of quarz sand (silica), 1750 kg of calcium carbonate and 550 kg of iron oxide and reductant components composed of 150 kg of coke powder and 500 kg of copper pieces. After the mixture was introduced into an electric furnace and heated at 1350° C. for 4 hours at a melted state, a glass-like oxide upper layer was flown out from the side of the electric furnace. Then, a copper oxide lower layer was flown out through the bottom of the electric furnace, which was molded into two plate-like electrodes. The two electrodes were equipped as anodes in an electrolytic cell for copper, and a copper plate of which purity was 99.99 percent was equipped as a cathode. The electrolysis was performed employing an electrolyte of 200 g/liter of sulfuric acid under the current density of 220 A/m$^2$.

When about 82 percent of the anodes were dissolved, the anodes, the cathode and anode slime were taken out from the electrolytic cell, and the anodes were dissolved and remolded to prepare an electrode.

Analysis of the anode slime gave 53 percent in weight of Pt, 17 percent in weight of Pd and 1.1 percent in weight of Rh, and 12 ppm of Pd and 7 ppm of Rh were contained in the copper of the cathode. In the electrolyte, 33 mg/liter of Pd and 30 mg/liter of Rh were dissolved.

The time required for carrying out the above procedures was 25 days.

The electrolyte was electrolyzed for copper elimination, the copper adhered to the cathode was reused and the electrolyte free of copper was reused as an electrolyte.

EXAMPLE 3

Crushed material of 1000 kg of SAC having a diameter of not more than 5 mm and containing 1000 ppm of Pt, 400 ppm of Pd and 100 ppm of Rh (the support had a honeycomb-like shape and consisted of 80 percent of cordierite, 15 percent of $\gamma$-alumina and 5 percent of other oxides) prepared by means of a crusher was mixed with flux components composed of 750 kg of quarz sand (silica), 1750 kg of calcium carbonate and 550 kg of iron oxide and reductant components composed of 100 kg of coke powder, 50 kg of active carbon particles containing 0.8 percent in weight of Pt, 0.3 percent in weight of Pd and 0.1 percent in weight of Ph and 560 kg of copper oxide powder. After the mixture was introduced into an electric furnace and heated at 1350° C. for 4 hours at a melted state, a glass-like oxide upper layer was flown out from the side of the electric furnace. Then, a copper oxide lower layer was introduced into a heated oxidation furnace through the bottom of the electric furnace. Oxygen rich air containing 40 percent of oxygen was blown on the surface of the molten bath to oxidize the portion of the metal copper. When the thickness of the copper oxide layer was reached to about 0.5 cm, the oxidation furnace was tilted so that the copper oxide layer was flown out, and was poured on a water-cooled roll for solidification by cooling.

The oxygen-rich air was continuously blown into the melted metal copper in the oxidation furnace. After the procedures of tilting the oxidation furnace for flowing out the copper oxide layer similarly formed and of solidifying the layer by cooling were repeated, the metal copper was introduced into a small-size oxidation furnace and 5 kg of sodium nitrate was added thereto when the weight of the metal copper layer containing the concentrated platinum group metal reached 30 kg. The procedures of oxidizing the portion of the metal copper and of flowing out and separating the copper oxide were repeated, and the oxidation procedure was stopped when the weight of the melted metal copper was reduced to about 3 kg. Then, the metal copper containing the concentrated platinum group metal was flown out and solidified by cooling.

The weight of the metal copper containing the concentrated platinum group metal thus obtained was 2.9 kg, the Pt content thereof was 48 percent in weight, Pd was 19 percent in weight and Rh was 5.2 percent in weight.

The time required for carrying out the above procedures was 19 hours.

For confirmation, analysis of the contents of the platinum group metals contained in the glass-like oxide layer gave not more than 1 ppm of Pt, not more than 0.2 ppm of Pd and not more than 0.1 ppm of Rh.

The recovery rates of Pt, Pd and Rh of the procedures of the above Examples 1 to 3 are not less than 99 percent while those of Pt, Pd and Rh of Comparative Example were 96 percent, 95 percent and 93 percent, respectively.

What is claimed is:

1. A process of recovering a platinum group metal from a catalyst comprising a catalyst support comprised mainly of at least one oxide of silicon, aluminum, magnesium and a rare earth metal, and said catalyst supports a platinum group metal; comprising:
    (a) mixing said catalyst with (i) copper, copper oxide, or a mixture thereof (ii) a flux component and (iii) a reductant component to form a mixture, then heating and melting said mixture to form a first layer containing metal copper and said platinum group metal and a second layer containing slag, and then separating said first layer from said second layer; and
    (b) then supplying air or oxygen as an oxidant to said first layer under heating and melting so as to oxidize a portion of said metal copper in an amount effective to form a third layer comprising oxidized metal copper and leaving a fourth layer containing unoxidized metal copper and said platinum group metal, and separating said fourth layer from said third layer.

2. The process of recovering a platinum group metal as in claim 1, wherein said third layer formed in step (b) is reused in said first process.

3. The process of recovering a platinum group metal as in claim 2, wherein an oxidant is added in step (b) selected from at least one of sodium nitrate, potassium nitrate or cupric oxide.

4. The process of recovering a platinum group metal as in claim 1, wherein an oxidant is added in step (b) selected from at least one of sodium nitrate, potassium nitrate or cupric oxide.

5. The process of recovering a platinum group metal as in any one of claims 1-3, wherein said reductant in step (a) comprises a base metal, a precious metal, active carbon and a resin.

6. The process of recovering a platinum group metal as in claim 1, wherein step (b) is repeated on said fourth layer.

7. The process of recovering a platinum group metal as in claim 1, wherein said platinum group metal is recovered from said catalyst in a range amount between 25 to 75%, by weight.

* * * * *